(12) United States Patent
Henze

(10) Patent No.: US 11,358,803 B2
(45) Date of Patent: Jun. 14, 2022

(54) CONTROL UNIT FOR A CONVEYOR WITH HARDWARE DETECTION

(71) Applicant: INTERROLL HOLDING AG, Sant' Antonino (CH)

(72) Inventor: Herbert Henze, Wermelskirchen (DE)

(73) Assignee: INTERROLL HOLDING AG, Sant' Antonino (CH)

( * ) Notice: Subject to any disclaimer, the term of this patent is extended or adjusted under 35 U.S.C. 154(b) by 768 days.

(21) Appl. No.: 15/571,887

(22) PCT Filed: May 9, 2016

(86) PCT No.: PCT/EP2016/060269
§ 371 (c)(1),
(2) Date: Dec. 7, 2018

(87) PCT Pub. No.: WO2016/177906
PCT Pub. Date: Nov. 10, 2016

(65) Prior Publication Data
US 2021/0323772 A1    Oct. 21, 2021

(30) Foreign Application Priority Data
May 7, 2015   (DE) .......................... 102015107167.3

(51) Int. Cl.
*B65G 43/08*   (2006.01)
*G05B 19/418*   (2006.01)

(52) U.S. Cl.
CPC ......... *B65G 43/08* (2013.01); *G05B 19/4189* (2013.01); *B65G 2203/0233* (2013.01); *G05B 2219/45054* (2013.01)

(58) Field of Classification Search
CPC ............ B65G 43/08; B65G 2203/0233; G05B 19/4189; G05B 2219/45054
See application file for complete search history.

(56) References Cited

U.S. PATENT DOCUMENTS

| 5,180,344 A | 1/1993 | Hail |
| 5,442,248 A | 8/1995 | Agnoff |

(Continued)

FOREIGN PATENT DOCUMENTS

| AT | 508662 | 3/2011 |
| AT | 13066 | 5/2013 |

(Continued)

OTHER PUBLICATIONS

Interroll Holding AG, "User Manual Interroll Conveyor Control System," www.interroll.com (Apr. 1, 2013).

*Primary Examiner* — Gene O Crawford
*Assistant Examiner* — Lester Iii Rushin
(74) *Attorney, Agent, or Firm* — Price Heneveld LLP

(57) ABSTRACT

A method for configuring a control unit in a conveyor, wherein a control unit controls one or more conveyor segments comprising a conveyor drive in signal communication with the control unit via a motor connection socket, and a sensor for detecting an object at a position within the conveyor segment. The conveyor is in signal communication with the control unit via a sensor connection socket. The control unit self-configures itself by: (i) activating a configuration mode in the control unit, (ii) receiving a signal from each motor connection socket or sensor connection socket, (iii) comparing the received signal(s) with a comparative value stored in the control unit, and (iv) determining whether a conveyor drive or a sensor is connected to a motor connection socket or a sensor connection socket of the control unit, respectively, based on the comparison of the signal(s) with the comparative value.

15 Claims, 4 Drawing Sheets

(56) References Cited

U.S. PATENT DOCUMENTS

| | | | |
|---|---|---|---|
| 5,485,590 A | 1/1996 | Hyatt et al. | |
| 5,530,643 A | 6/1996 | Hodorowski | |
| 6,117,318 A | 9/2000 | Simonelli | |
| 6,124,656 A | 9/2000 | Jensen | |
| 6,200,036 B1 | 3/2001 | Girardey | |
| 6,240,335 B1 | 5/2001 | Wehrung et al. | |
| 6,522,944 B2* | 2/2003 | Wielebski | B65G 47/261 700/224 |
| 6,633,278 B1 | 10/2003 | Hoegener | |
| 6,672,449 B2 | 1/2004 | Nakamura et al. | |
| 6,701,214 B1 | 3/2004 | Wielebski et al. | |
| 7,207,433 B2 | 4/2007 | Schaefer | |
| 8,006,829 B2 | 8/2011 | Itoh et al. | |
| 8,381,901 B2 | 2/2013 | Yamamoto | |
| 8,695,786 B2* | 4/2014 | Breen | B65G 47/261 198/781.05 |
| 8,757,363 B2 | 6/2014 | Combs et al. | |
| 9,359,142 B2 | 6/2016 | Jepsen | |
| 9,618,056 B2 | 4/2017 | Itoh | |
| 9,731,900 B2 | 8/2017 | Rugger | |
| 2002/0010527 A1 | 1/2002 | Wielebski et al. | |
| 2003/0116408 A1* | 6/2003 | Topmiller | B65G 47/261 198/781.05 |
| 2003/0135299 A1* | 7/2003 | Tachibana | B65G 43/10 700/213 |
| 2003/0168316 A1 | 9/2003 | Knepple et al. | |
| 2004/0144623 A1 | 7/2004 | Newsom et al. | |
| 2005/0083188 A1 | 4/2005 | Choi | |
| 2006/0030968 A1 | 2/2006 | Ko et al. | |
| 2006/0293782 A1 | 12/2006 | Rees | |
| 2007/0197072 A1 | 8/2007 | Hvidberg et al. | |
| 2008/0270427 A1 | 10/2008 | Franke et al. | |
| 2010/0322473 A1 | 12/2010 | Taylor et al. | |
| 2012/0024669 A1 | 2/2012 | Danelski et al. | |
| 2012/0175223 A1* | 7/2012 | Breen | B65G 43/10 198/459.8 |
| 2012/0175225 A1 | 7/2012 | Breen et al. | |
| 2012/0211330 A1 | 8/2012 | Ziegler | |
| 2012/0259436 A1 | 10/2012 | Resurreccion et al. | |
| 2012/0290126 A1 | 11/2012 | Combs et al. | |
| 2013/0134017 A1 | 5/2013 | Hail et al. | |
| 2013/0190915 A1 | 7/2013 | Choo et al. | |
| 2014/0156063 A1 | 6/2014 | Neiser et al. | |
| 2014/0277698 A1 | 9/2014 | Combs et al. | |
| 2014/0326582 A1 | 11/2014 | Sakaguchi | |
| 2015/0068874 A1 | 3/2015 | Jepsen et al. | |
| 2015/0151921 A1 | 6/2015 | Collot | |
| 2015/0234746 A1* | 8/2015 | Jo | G06F 12/0862 711/103 |
| 2015/0236876 A1* | 8/2015 | Cadugan | H04L 7/042 375/242 |
| 2016/0080526 A1 | 3/2016 | Meyer-Graefe | |
| 2016/0318714 A1 | 11/2016 | Reischl | |
| 2018/0009607 A1 | 1/2018 | Tiedemann | |

FOREIGN PATENT DOCUMENTS

| | | | |
|---|---|---|---|
| CN | 2033808 U | 3/1983 | |
| CN | 2199164 Y | 5/1995 | |
| CN | 200971264 | 11/2007 | |
| CN | 203682423 U | 7/2014 | |
| DE | 1978258 | 2/1968 | |
| DE | 3538173 | 1/1987 | |
| DE | 4230729 | 3/1993 | |
| DE | 69306884 | 5/1997 | |
| DE | 19811130 | 9/1999 | |
| DE | 102006004421 | 8/2006 | |
| DE | 102006054575 | 9/2008 | |
| DE | 102008053557 | 9/2009 | |
| DE | 102008018205 | 12/2009 | |
| DE | 202008017534 | 12/2009 | |
| DE | 20200902821 | 2/2011 | |
| DE | 202009012822 | 2/2011 | |
| DE | 102010037601 | 4/2011 | |
| DE | 202012000793 | 4/2012 | |
| DE | 102010044027 | 5/2012 | |
| DE | 102011004802 | 8/2012 | |
| DE | 102011109531 | 2/2013 | |
| DE | 102015106026 | 8/2016 | |
| DE | 102015104130 | 9/2016 | |
| DE | 102015106034 | 10/2016 | |
| DE | 102015106024 | 11/2016 | |
| DE | 102015107167 | 11/2016 | |
| DE | 102015114030 | 3/2017 | |
| EP | 1021664 | 1/2002 | |
| EP | 1277096 | 1/2003 | |
| EP | 1454851 | 9/2004 | |
| EP | 1656312 | 5/2006 | |
| EP | 1675244 | 6/2006 | |
| EP | 2369211 | 9/2011 | |
| EP | 2455310 | 5/2012 | |
| EP | 3212543 A1 | 9/2017 | |
| JP | S5741821 | 3/1982 | |
| JP | S5890447 | 5/1983 | |
| JP | S59180609 | 10/1984 | |
| JP | S6015308 | 1/1985 | |
| JP | H05236612 | 9/1993 | |
| JP | 2003026603 | 1/2003 | |
| JP | 2003104534 | 4/2003 | |
| JP | 2004098554 | 4/2004 | |
| JP | 2014516895 | 7/2014 | |
| JP | 2014142740 | 8/2014 | |
| JP | 2017534862 A * | 11/2017 | |
| WO | WO-0184259 A1 * | 11/2001 | B65G 47/31 |
| WO | 0203153 | 1/2002 | |
| WO | 02098768 | 5/2002 | |
| WO | 2010142029 | 12/2010 | |
| WO | 2011029120 | 3/2011 | |
| WO | 2012094690 | 7/2012 | |
| WO | 2012113922 | 8/2012 | |
| WO | 2012154650 | 11/2012 | |
| WO | 2013000006 | 1/2013 | |
| WO | 2013000006 A2 | 1/2013 | |
| WO | 2014011459 | 1/2014 | |
| WO | 2014057984 | 4/2014 | |
| WO | 2016066495 A1 | 5/2016 | |
| WO | 2016169982 | 10/2016 | |
| WO | 2016169986 | 10/2016 | |
| WO | 2016177906 | 10/2016 | |
| WO | 2014178399 | 2/2017 | |
| WO | 2018009607 A1 | 1/2018 | |

* cited by examiner

|  |  | NPN | | | | PNP | | | |
| --- | --- | --- | --- | --- | --- | --- | --- | --- | --- |
|  |  | Closing contact | Break contact | | | Closing contact | Break contact | | |
|  |  | Photoelectric sensor | Photoelectric barrier | | | Photoelectric sensor | Photoelectric barrier | | |
| 1. Sensor idle | Measured value | 12 V | | 0 V | | 12 V | | 24 V | |
|  | Config. | NPN | PNP | NPN | PNP | NPN | PNP | NPN | PNP |
|  | Logic value | 0 | 0 | 1 | 0 | 0 | 0 | 0 | 1 |
| 2. Object at sensor | Measured value | 0 V | | 12 V | | 24 V | | 12 V | |
|  | Config. | NPN | PNP | NPN | PNP | NPN | PNP | NPN | PNP |
|  | Logic value | 1 | 0 | 0 | 0 | 0 | 1 | 0 | 0 |

Fig. 4

CONTROL UNIT FOR A CONVEYOR WITH HARDWARE DETECTION

CROSS-REFERENCE TO FOREIGN PRIORITY APPLICATION

The present application claims the benefit under 35 U.S.C. §§ 119(b), 119(e), 120, or 365(c) of PCT/EP2016/060269 filed May 9, 2016, which claims priority to German Application No. 102015107167.3 filed May 7, 2015.

FIELD OF THE INVENTION

The invention relates to a method for configuring a control unit in a conveyor, wherein a control unit controls one or more conveyor segments and each conveyor segment comprises a conveyor drive for conveying an object through the conveyor segment, said conveyor drive being in signal communication with the control unit via a motor connection socket, and a sensor for detecting an object at a position within the conveyor segment, said conveyor being in signal communication with the control unit via a sensor connection socket. Another aspect of the invention is a control unit for a conveyor, wherein the control unit is adapted to control one or more conveyor segments and each conveyor segment comprises a conveyor drive for conveying an object through the conveyor segment, said conveyor drive being in signal communication with the control unit via a motor connection socket, and a sensor for detecting an object at a position within the conveyor segment, said conveyor being in signal communication with the control unit via a sensor connection socket.

BACKGROUND OF THE INVENTION

Conveyors and methods for operating them are basically known from EP1656312B1 or AT13066U1, for example. Conveyors are used in conveyor systems in which logistics processes run fully and semi-automatically. Objects such as parcels, pallets, goods, and other merchandise are conveyed from an entry point to an exit point by means of conveyors. In complex conveyor systems, the entry points and the exit points are sometimes far apart. Conveyors are subdivided into several conveyor segments arranged in a series one after the other, and can thus form a conveyor line which conveys goods downstream from the entry point to their exit point. Conveyor lines can be installed parallel to each other and may be interconnected by means of mergers, singulators, lowerators or elevators, for example. This results in complex conveying devices consisting of several conveyor segments. In principle, each conveyor segment can have a separate control unit disposed in a housing, or the control units for several neighbouring conveyor segments may be combined in a common control module.

In many cases, a conveyor segment is also fitted with a sensor unit which provides information in the form of a "busy" signal about whether a conveyor segment is busy conveying an article or whether it is idle. Typical sensors used in this connection include photoelectric barriers, photoelectric sensors, optical scanners, and proximity switches. During operation of a conveyor system, this information is needed for monitoring and planning the flow of goods. Each conveyor segment has a conveyor drive, for example, roller drives, belt drives, and vibration drives, inter alia. In order to drive each one individually, each conveyor segment is in signal communication with a control unit.

When installing a new conveyor line or conveyor, or when additions or modifications are made to an installed conveyor line or conveyor, conveyor lines and conveyors are assembled and connected for signal communication in such a way that each sensor unit and each conveyor drive is in signal communication with a control unit. This is generally done using cabling, by inserting a cable, which has a plug at one end and which is connected to the sensor or to the conveyor drive, into a matching connector socket on the control unit. In principle, however, this signal communication can also be effected in some other way, for example in the reverse manner, such that a connector plug of the control unit is inserted into a connector socket of the conveyor drive or the sensor unit, or by setting up wireless signal transmission. In this regard, signal communication in the context of the present description and the claims is to be understood as a wired or wireless signal transmission path, and a connector socket is to be understood as a respective connector unit for a wired connection or a respective module for a wireless signalling connection.

The installation of a conveyor line or conveyor, or the modification of an existing installation, must comply with numerous stipulations and restrictions, which may ensue from structural conditions, the topology of the conveyor lines within the conveyor, or the properties of the control units. To simplify assembly, it is known from the prior art to use control units that can control two, three, four, or even more conveyor segments and which have connectors for the respective two, three, four, or even more conveyor drives and sensors. Such control units may be fully assigned, by which it is meant that all the connectors are in signal communication with respective conveyor drives or sensors or, in certain installation situations, may be only partly assigned. After establishing signal communication, it is necessary that a user assigns the sensors and conveyor drives to one another. This can be done by using specific, appropriately labelled connector sockets on the control unit to connect them, so that the assignment is evident from the way they are connected, or it can also be done by the operator in a subsequent programming step, if such assignment based on connections is not possible or desirable. Assignment based on connections is considered disadvantageous in many cases because it limits the structural versatility of the conveyor line. For example, it is necessary in certain conveying applications to provide two conveyor drives in one conveyor segment, for example, to transfer a stronger conveying force in upward slopes or to convey objects that are particularly heavy. In this case, however, a 1:1 assignment of conveyor drive and sensor can no longer be carried out at the control unit by means of connections, because the conveyor segment will generally only have one sensor, but two conveyor drives.

Another problem encountered when installing conveyor lines and conveyors is that different types of sensors are used by the user. It is known, for example, to use NPN sensors or PNP sensors, and it is also known to use sensors that are normally open, i.e., which output a logic signal "0" when there is no object in front of the sensor, and which output a logic signal "1" when an object is present, whereas other sensors which are normally closed output logic signals the other way round. Depending on which type of sensor is being used, this then has to be taken into consideration, either in the type of cabling or in the way the sensor is programmed, or in the way that its signals are processed.

Prior art installation procedures are time-consuming for that reason and cause significant downtimes of conveyors. There is a basic conflict between having to increase the versatility of the conveyor—by making it adaptable to different conveying tasks, and by implementing different conveyor drives and sensors—yet simplifying installation at the same time. Until now, however, simplified installation can only be achieved by simplifying the components, which is accompanied by a concomitant reduction of versatility.

SUMMARY OF THE INVENTION

Within this context, the object of the invention is to simplify the installation of conveyors without compromising their versatility.

This object is achieved, according to the invention, with a method of the kind initially specified, in which the control unit self-configures itself, said self-configuration comprising the steps of (i) activating a configuration mode in the control unit, (ii) receiving a signal from each motor connection socket or sensor connection socket of the control unit in a processor unit of the control unit, (iii) comparing the received signal(s) with a comparative value stored in the control unit, and (iv) determining whether a conveyor drive or a sensor is connected to a motor connection socket or a sensor connection socket of the control unit, respectively, based on the comparison of the signal(s) with the comparative value.

The invention makes it possible to install and configure a conveyor which has a high level of versatility in terms of structure and the components used, while at the same time significantly reducing the amount of effort involved in installing it. This is achieved, according to the invention, by the control unit self-configuring itself. When performing this self-configuration, the control unit is firstly put into a configuration mode. This activation of the configuration mode involves specific procedural routines and switches in the control unit being invoked. In principle, the configuration mode can be activated in such a way that the control unit self-diagnoses itself every time it is switched on, and that the control unit then checks whether self-configuration is required, for example, because unconfigured components connected to the control unit have been identified or because previously configured components are no longer connected. It is particularly preferred, however, that the configuration mode can be actively triggered at the control unit, for example, by remote transmission of a command to the control unit, by pressing a button, or operating a switch on the control unit, or by operating a magnetic contact, such as a Hall sensor or a Reed contact by means of a magnet.

After the control unit has been put into configuration mode, signals from connector sockets of the control unit are received and processed by an electronic processor unit which carries out the configuration. These connector sockets may be motor connection sockets to which conveyor drives, diverter or merge drives, elevator drives, and the like can be connected. These connector sockets may also be sensor connection sockets, to which all kinds of sensors or signal transducers can be connected, such as photoelectric barriers, photoelectric sensors, displacement sensors, sensing devices, and the like.

The signals that the processor unit receives from these connector sockets may differ according to the purpose of configuration and the kind of configuration. For example, signals can be sent from the processor unit to each connector socket in the form of voltages applied to specific contacts in the connector socket, with the processor unit then checking whether signals which are then expected are received from said contacts or from other contacts in the connector socket, in the form of a voltage, a current, or the like. The signals may consist in a voltage or current being measurable at all or not measurable, or they may consist in the quantitative level of a voltage or current, or in other kinds of signal waveform, such as a particular plot over time, for example, a constant or abrupt increase or decrease in a voltage or current.

The signals thus received are compared inside the processor unit with a comparative value. Such a comparative value can be an absolute value, in the form of a reference value, a limit or a limit range, or a table of values, but it can also be a series of values as a function of time in order to compare received signal waveforms with said series of values.

According to the invention, the results of the comparison are then used to determine whether a component, such as a conveyor drive or a sensor, is connected to the connector socket. It is also possible to determine which type of component is connected to the connector socket. Thus, with the method according to the invention, it is possible for the components connected to a control unit, such as conveyor drives and sensors, to be quickly identified and installed without the user having to intervene and manually program the control unit. This analysis and self-configuration is performed automatically by the appropriately programmed processor unit in the control unit after the configuration mode is activated. Self-configuration can be carried out separately for each control unit installed in a conveyor line or conveyor, and, in particular, can be carried out simultaneously for several or all control units in such a conveyor, thus allowing the user to save a considerable amount of time and effort. It is possible, in particular, to trigger the activation signal for the configuration mode at a control unit and, proceeding from that basis, to spread the configuration mode via appropriate communication between the control units, for example, via bus communication, so that the other control units also switch to the configuration mode and self-configure themselves in response to this signal triggered once only.

According to a first preferred embodiment, each motor connection socket is polled in step (ii) by the processor unit for an interference signal, a comparison is made in step (iii) to determine whether an interference signal has been received or whether no interference signal has been received, and it is determined in step (iv) for each motor connection socket that a conveyor drive is connected to the motor connection socket if no interference signal has been received, and that no conveyor drive is connected to the motor connection socket if an interference signal is received, or, in step (i), all the conveyor drives connected to the control unit are activated, in step (ii) an activity signal, preferably a motor operating current or a sensor signal from a sensor mechanically coupled to the conveyor drive, is received at each motor connection socket in the processor unit, in step (iii) the received activity signal is compared with a reference value as the comparative value, and in step (iv), if an activity signal is present, it is determined that a conveyor drive is connected to the motor connection socket and in the absence of an activity signal it is determined that no conveyor drive is connected to the motor connection socket. The sensor can be a rotary encoder, for example, and the pulses from this rotary encoder coupled to the motor or to the conveyor can be analysed as an activity signal.

According to this embodiment, the presence of a conveyor drive connected to a motor connection socket is detected either by polling each motor connection socket for an interference signal, or by trying, via the motor connection socket being checked, to activate a conveyor drive connected thereto and to receive an activity signal from said conveyor drive. By applying this procedure, it can generally be determined with certainty whether a conveyor drive is connected to the motor connection socket. A motor which is properly connected will not produce an interference signal, whereas a motor connection socket which is not used because no conveyor drive is connected to it, or because a conveyor drive is wrongly connected, will generate such an interference signal and will thus emit a signal which can be analysed by the processor unit. When trying to switch on motors, it is similarly possible to detect and analyse at which motor connection sockets there is a flow of current indicating a connected conveyor drive and at which motor connection sockets there is no such flow of current, which allows the conclusion to be drawn that no conveyor drive is connected. Similarly, in step (i), all the conveyor drives connected to the control unit can be activated, and in step (ii) a signal from a sensor, such as a rotary encoder, can be received at each motor connection socket in the processor unit, in step (iii) the received activity signal, i.e., a motor operating current or sensor signal is compared with a reference value as the comparative value, and in step (iv), if a corresponding activity signal is present, it is concluded that a conveyor drive is connected to the motor connection socket, and in the absence of a rotary encoder value it is concluded that no conveyor drive is connected to the motor connection socket.

It is still further preferred that the control unit has a plurality of motor connection sockets and that an assignment plan for the motor connection sockets is calculated after step (iv) and compared with a reference assignment plan comprising a reference assignment pattern for every possible number of connected conveyor drives, and that in the event of any divergence from the reference assignment plan, an error message, in particular a visual or acoustic signal, is outputted by the control unit. This embodiment allows a control unit to which several conveyor drives may be connected to be correctly installed and tested in a quick manner. The processor unit carries out checks to identify the motor connection sockets to which a conveyor drive is connected. When the motor connection sockets are correctly assigned, this configuration step is completed, but if the first and the third, or the first and the fourth motor connection sockets are assigned, when a total of two conveyor drives, for example, are connected to a control unit having four motor connection sockets, for example, then an error message, such as a visual or acoustic signal, is outputted in order to signal this incorrect connection scheme to the operator, so that the operator can modify the installation to a correct connection scheme with the first and the second motor connection sockets being assigned. The acoustic or visual signal which is outputted in that regard may be outputted by an appropriate signalling device forming part of the control unit, for example, a light signal from a light-emitting diode or a buzzing sound. It is preferred that the visual signal is provided by the processor unit causing a particular motion sequence of the wrongly connected conveyor drive, for example, a sequence of short forward and backward movements of said conveyor drive, interrupted by pauses in a predetermined sequence, which signals incorrect installation to the user and points directly at the wrongly installed conveyor drive.

According to another preferred embodiment, each sensor connection socket is polled for an interference signal by the processor unit in step (ii), a comparison is made in step (iii) to determine whether an interference signal has been received or whether no interference signal has been received, and it is established in step (iv) for each sensor connection socket that a sensor is connected to the sensor connection socket if no interference signal has been received, and that no sensor is connected to the sensor connection socket if an interference signal is received, or in step (i) all the sensors connected to the control unit are activated, in step (ii) a sensor signal is received at each sensor connection socket in the processor unit, in step (iii) the received sensor signal is compared with a reference value as the comparative value, and in step (iv), if a sensor signal is present, it is determined that a sensor is connected to the sensor connection socket and in the absence of a sensor signal it is determined that no sensor is connected to the sensor connection socket. According to this embodiment, the presence of sensors connected to the sensor connection sockets is detected in that an interference signal is received from the sensor connection socket that is respectively polled, or an activation signal is sent to the respective sensor connection socket and a check is carried to determine how the other contacts or one other contact of the sensor connection socket responds to said activation signal. This checking procedure is analogous to the checking procedure described above for the conveyor drives connected to the motor connection sockets, using an interference signal or the application of a motor operating current, and can likewise result in an unused sensor connection socket being inferred from the presence of an interference signal, or in the conclusion being drawn, from the reception of a signal from a contact of the sensor connection socket when an activation signal is applied to said contact or to some other contact, that a sensor is connected to said sensor connection socket.

It is still further preferred that the control unit has a plurality of sensor connection sockets and that an assignment plan for the sensor connection sockets is calculated after step (iv) and compared with a reference assignment plan comprising a reference assignment pattern for every possible number of connected sensors, and that in the event of any divergence from the reference assignment plan, an error message, in particular a visual or acoustic signal, is outputted by the control unit. In the case of control units having a plurality of sensor connection sockets, this embodiment allows the number of connected sensors and the assignment pattern of the sensor connection sockets to be detected during self-configuration, and any incorrect assignment of the sensor connection sockets to be indicated. As before, this indication can take the form of a visual or acoustic signal, and allows the user to quickly detect and remedy any incorrect installation.

If there are several sensor connection sockets and several motor connection sockets on the control unit, it is also preferred that the processor unit compares the number of detected sensors with the number of detected conveyor drives and generates an error message if the number of detected sensors is greater than the number of detected conveyor drives. To provide a conveyor line with a properly functioning structure, it is preferred, as a basic principle, that one conveyor drive be assigned to each sensor and that these can then form a conveyor segment. In this case, a logic relationship between activation of said conveyor drive and the sensor signal that is received can be controlled by the control unit. To perform this kind of control, the respective conveyor drive must be assigned to the respective sensor in the control unit so as to define the respective conveyor segment. If it is established, in contrast, that no sensor has been assigned to a particular conveyor drive, or no conveyor drive has been assigned to a particular sensor, this constitutes incomplete configuration of the conveyor and in the worst case can lead to objects being wrongly conveyed by means of the conveyor. In that case, an error message is outputted, which can consist of an acoustic or a visual signal, as described above.

According to another preferred embodiment, the control unit is adapted to connect and to process sensor signals from different types of sensor, and the sensor type is determined by the processor unit applying a predetermined output signal to each sensor connection socket, the processor unit receiving an input signal from each sensor connection socket, the received input signal being compared with a predetermined reference value, and the sensor type being determined on the basis of a comparison of the received sensor signal with the predetermined reference value of the sensor type. The conveyor according to the invention and the method according to the invention for setting up the conveyor are basically suitable for implementing sensors of different types. Sensors can assume different roles in conveyors. Their main task may be to detect whether a conveyed object is located in a particular area or not; photoelectric barriers or photoelectric sensors, for example, can be used for this purpose. Other sensors can detect positions for diverts or merges or elevators or the like, or can read barcodes or RFID tags on conveyed objects, or the like. According to the invention, these different types of sensors can be connected to the control unit, and the control unit can detect during self-configuration which type of sensor is connected. This allows the sensor data to be correctly interpreted and processed during subsequent operation of the conveyor, and allows the conveyor to be represented, visualised, or set up accordingly. This can be carried out, for example, on a central processor unit which is in signal communication with the control units of the conveyor.

To determine the sensor type, an output signal is applied to a sensor connection socket and an input signal is received from the sensor connection socket or the sensor connected to it. The input signal, and also the output signal where relevant, are then compared with a predetermined reference value or predetermined reference values, respectively, and a basic distinction between different sensor types can be made on that basis, so that a specific sensor type can be determined for the connected sensor. This procedure can be improved, thus allowing many different sensor types to be distinguished, by creating a particular detection state for the sensor before carrying out these steps, for example, by placing an object in front of a sensor which is meant to detect the presence of an object or by deliberately making the sensor idle, or by moving displacement sensors at an end stop, or such like. For that purpose, the operator may be prompted, using an appropriate signal outputted from the processor unit, to create the detection state by placing an object in front of the sensor, or by making the sensor idle. The method can also be improved with even finer distinctions being made between different sensor types, by firstly creating a first detection state before the configuration steps, then creating a second detection state and repeating the configuration steps. In this way, it is possible by testing the input and output signals in a differentiated, logical manner under different detection states of the sensor, for example, when there is an object in front of the sensor and when the sensor is idle, i.e., when there is no object in front of the sensor, to draw conclusions from the input and output signals of the sensor about the type of sensor that is connected, and to distinguish between different sensor types. In principle, it may be possible with these measures to distinguish sensor types such as PNP sensors from NPN sensors, and to distinguish sensors of the "normally open" type from sensors of the "normally closed" type It is further preferred that the sensor types differ in that one sensor type has an NPN configuration and another sensor type has a PNP configuration and/or in that the sensor types differ by one sensor type having a normally open configuration and another sensor type having a normally closed configuration. According to this embodiment, sensor types which have proved to be particularly suitable for the conveyor according to the invention are distinguished or identified during self-configuration. This distinguishing and differentiating can be carried out in the steps previously described.

It is still further preferred that the predetermined output signal is applied by programming the sensor connection socket to positive switching logic and PNP, and that the input signal is interpreted into a logic value by the processor unit and that a comparison with a predetermined reference value is made on the basis of said logic value, and that all the sensor connection sockets from which an input signal corresponding to the logic value "1" are specified as sensor type PNP, normally closed. This embodiment allows a sensor type to be uniquely identified on the basis of logic (Boolean) operations, by retrieving output signals from the sensor in accordance with specific programming and converting them into logic values, then comparing these logic values, for example, with reference to a table of values, with specific logic patterns describing the behaviour of specific sensor types, thus allowing the sensor type to be identified uniquely.

According to another preferred embodiment, the sensor is monitored by the processor unit, and in a first configuration step, the sensor is idle and a first input signal from the sensor is received by the processor unit, and in a second configuration step, the sensor is busy with an object located in the conveyor segment, and a second input signal from the sensor is received by the processor unit, and the sensor type is determined by the processor unit by performing a logic analysis on the first and the second input signal. With this development of the invention, the sensor type is determined on the basis of two analytical steps, with the sensor being busy in one of the two analytical steps and idle in the other. This can be done by placing an object in front of the sensor, or triggering the sensor with one's hand, to simulate the sensor being busy. The order in which the two analytical steps are performed has no significance for the result. The user can be prompted by a signal generated by the processor unit to make the sensor busy or idle in order to carry out the two analytical steps in sequence.

It is further preferred when the control unit has a plurality of sensor connection sockets and a plurality of motor connection sockets, and after step (iv) a plan for assigning the connected sensors to the connected conveyor drives is calculated, said method comprising the steps of: placing an object into a conveyor segment and activating the conveyor drive of the conveyor segment in a first conveying direction, monitoring of the sensor signals by the processor unit, and assigning, by the processor unit, of the conveyor drive to a sensor which changes its signal after activation of the conveyor drive. As previously explained, a conveyor line or conveyor basically consists of a plurality of conveyor segments. Each conveyor segment has at least one conveyor drive and one sensor. Such a conveyor segment is controlled by the control unit. The sensor signal from the conveyor segment is processed according to particular forms of control, and the conveyor drive is controlled according to the sensor signal. In other forms of control, the sensor signal from a downstream conveyor segment directly adjacent to this conveyor segment is monitored, and the conveyor drive is controlled according to said sensor signal from the adjacent downstream conveyor segment. It is generally necessary for these forms of control to assign a sensor to a particular conveyor drive so that these forms of control can be logically implemented by the control unit according to said dependencies. According to this development of the invention, the sensors are assigned during the self-configuration process. Specific configuration steps are carried out to that end, in which an object placed in a conveyor segment is conveyed by activating a particular conveyor drive and the sensors within the conveyor line or conveyor are all monitored. The sensor which is triggered by the conveyed object, or the sensor which is first triggered by the conveyed object, where relevant, can then be assigned in some way to the conveyor drive. The kind of assignment that is carried out can be one in which the sensor and the activated conveyor drive are logically combined to form a conveyor segment. The assignment can also take the form of a logic control dependency being created between said sensor and the activated conveyor drive. With regard to the creation of these logic control dependencies, it should be understood, in general, that due to the possibility of the control unit also knowing about adjacent conveyor segments and the order in which the individual conveyor segments are assigned, and being able to process these accordingly, the logic relationships between the sensors and the conveyor drives which are necessary for control can be set or programmed accordingly, depending on the desired form of control. To provide extensive programming options, it suffices, for example, if the control unit is aware of the respective, mutually assigned conveyor drive and sensor within a conveyor segment, is aware of the order of conveyor segments along the conveyor line, or is aware of the conveyor segments which are adjacent to each other, to such an extent at least that the control unit has knowledge about the conveyor segments it controls and about the respective immediately adjacent downstream conveyor segment and, where relevant, the immediately adjacent upstream conveyor segment. In this case, the necessary connections between the sensor signals and how the conveyor drives are controlled by the control unit can be established for the single take-off or block take-off methods of controlling the conveying process, which are to be realised with the conveyor according to the invention.

It is still further preferred that an additional drive of the conveyor segment is detected and assigned by performing the steps in which the processor unit signals the non-assigned additional drive to an operator by outputting a visual or acoustic signal, in particular a predetermined sequence of start-stop operations of the additional drive, the processor unit monitors the sensor signals, the operator manually triggers the sensor, and the processor unit assigns the manually triggered sensor to the additional motor. With this development of the invention, sensors can be assigned directly to a particular conveyor segment by the operator triggering the sensor after being prompted accordingly by a signal from the processor unit. It should be understood, as a basic principle, that the sensor of a conveyor segment can be uniquely assigned to the conveyor drive of this same conveyor segment and that this assignment can be stored in the control unit. However, it is equally possible that the sensor of the immediately adjacent downstream conveyor segment is assigned to the conveyor drive of the conveyor segment upstream therefrom, by this procedure, and that this assignment is stored in the control unit.

In the preferred embodiments described above, in which the sensor signals are monitored by the processor unit, it is particularly preferred if sensor activation is continually switched during said monitoring between sensor type PNP and sensor type NPN. By monitoring in this way, it is possible to determine the sensor type in a simple manner by performing a logic analysis on the sensor signals, because it is possible to perform a logic analysis on four different constellations when the conveying process runs normally, namely, an idle sensor with PNP and NPN activation, and a busy sensor with PNP and NPN activation. It is normally possible to determine the sensor type uniquely from these four analytical steps.

Another aspect of the invention is a method for configuring a control unit in a conveyor, wherein a control unit controls one or more conveyor segments and each conveyor segment comprises a conveyor drive for conveying an object through the conveyor segment, said conveyor drive being in signal communication with the control unit via a motor connection socket, and, if necessary, having a sensor for detecting an object at a position within the conveyor segment, said conveyor being in signal communication with the control unit via a sensor connection socket, wherein the control unit self-configures itself, and that a visual signal is outputted to a user during said self-configuration to signal an incorrect or a correct installation state, wherein the visual signal takes the form of a predetermined sequence of movements by the conveyor drive.

According to this embodiment, an incorrect or a correct installation state is signalled to the user in the form of a sequence of movements by the conveyor drive. In the simplest case, this sequence of movements can be a constantly running conveyor drive, but it can also take the form of predetermined sequences consisting of starting and stopping operations, movements back and forth, and/or pauses in movement. Self-configuration may consist in the simplest case of self-analysis, for example, checking the kind or configuration of connections, but it can equally well include more extensive configuration steps, such as internal programming, parameter setting, and such like. An incorrectly installed conveyor drive can be signalled, in particular, by exactly the same conveyor drive performing the sequence of movements. It is also possible for an incorrectly installed sensor to be signalled, in particular, by a conveyor drive assigned to that sensor within the conveyor segment performing the sequence of movements. The sequence of movements for an incorrectly installed conveyor drive can preferably be a different sequence of movements from the one used for an incorrectly installed sensor.

The sequence of movements can also be used for correctly installed conveyor drives or sensors, for example, as acknowledgement of correct installation. Sequences of movements consisting of previously described elements can be used here as well, in particular elements from the various aforementioned sequences.

The aforementioned method can be developed by the self-configuration being carried out in accordance with a method of the kind previously described, and the visual signal preferably forms the error message or the visual signal of this self-configuration.

Another aspect of the invention is a control unit for a conveyor, wherein the control unit is adapted to control one or more conveyor segments and each conveyor segment comprises a conveyor drive for conveying an object through the conveyor segment, said conveyor drive being in signal communication with the control unit via a motor connection socket, and a sensor for detecting an object at a position within the conveyor segment, said conveyor being in signal communication with the control unit via a sensor connection socket, which is developed in such a way that the control unit includes an electronic processor unit which is adapted to self-configure itself, said self-configuration comprising the steps of: activating a configuration mode in the control unit, receiving a signal from each motor connection socket or sensor connection socket of the control unit in a processor unit of the control unit, comparing the received signal(s) with a comparative value stored in the control unit, and determining whether a conveyor drive or a sensor is connected to a motor connection socket or a sensor connection socket of the control unit, respectively, based on the comparison of the signal(s) with the comparative value.

This conveyor can be developed in such a way that the control unit includes an electronic processor unit which is adapted to self-configure itself, said self-configuration comprising the steps of:
- (i) activating a configuration mode in the control unit,
- (ii) receiving a signal from each motor connection socket or sensor connection socket of the control unit in a processor unit of the control unit,
- (iii) comparing the received signal(s) with a comparative value stored in the control unit, and
- (iv) determining whether a conveyor drive or a sensor is connected to a motor connection socket or a sensor connection socket of the control unit, respectively, based on the comparison of the signal(s) with the comparative value.

This conveyor can be developed by adapting the processor unit such that: each motor connection socket is polled in step (ii) by the processor unit for an interference signal, a comparison is made in step (iii) to determine whether an interference signal has been received or whether no interference signal has been received, and it is established in step (iv) for each motor connection socket that a conveyor drive is connected to the motor connection socket if no interference signal has been received, and that no conveyor drive not connected to the motor connection socket if an interference signal is received, or, in step (i), all the conveyor drives connected to the control unit are activated, in step (ii) an activity signal, in particular, a motor operating current or a sensor signal from a sensor mechanically coupled to the conveyor drive, is received at each motor connection socket in the processor unit, in step (iii) the received motor operating current is compared with a reference value as the comparative value, and in step (iv), if an activity signal is present, it is determined that a conveyor drive is connected to the motor connection socket and in the absence of an activity signal it is determined that no conveyor drive is connected to the motor connection socket.

This conveyor can be developed in such a way that the control unit has a plurality of motor connection sockets and the processor unit is adapted to calculate an assignment plan for the motor connection sockets after step (iv) and to compare it with a reference assignment plan comprising a reference assignment pattern for every possible number of connected conveyor drives, and in the event of any divergence from the reference assignment plan, to output an error message, in particular a visual or acoustic signal.

This conveyor can be developed in such a way that the processor unit is adapted to poll each sensor connection socket for an interference signal in step (ii), to make a comparison in step (iii) to determine whether an interference signal has been received or whether no interference signal has been received, and to determine in step (iv) for each sensor connection socket that a sensor is connected to the sensor connection socket if no interference signal has been received, and that no sensor is connected to the sensor connection socket if an interference signal is received, or in step (i) to activate all the sensors connected to the control unit, to receive a sensor signal at each sensor connection socket in the processor unit in step (ii), to compare the received sensor signal with a reference value as the comparative value in step (iii), and in step (iv), if a sensor signal is present, to determine that a sensor is connected to the sensor connection socket and in the absence of a sensor signal to determine that no sensor is connected to the sensor connection socket.

This conveyor can be developed in such a way that the control unit has a plurality of sensor connection sockets and the processor unit is adapted to calculate an assignment plan for the sensor connection sockets after step (iv) and to compare it with a reference assignment plan comprising a reference assignment pattern for every possible number of connected sensors, and in the event of any difference from the reference assignment plan, to output an error message, in particular a visual or acoustic signal.

This conveyor can be developed such that the processor unit is adapted to compare the number of detected sensors with the number of detected conveyor drives and to generate an error message if the number of detected sensors is greater than the number of detected conveyor drives.

This conveyor can be developed such that the control unit is adapted to connect and to process sensor signals from different types of sensor and the processor unit is adapted to determine the sensor type, by the processor unit applying a predetermined output signal to each sensor connection socket, the processor unit receiving an input signal from each sensor connection socket, the received input signal being compared with a predetermined reference value, and the sensor type being determined on the basis of a comparison of the received sensor signal with the predetermined reference value.

This conveyor can be developed such that the sensor types differ by one sensor type having an NPN configuration and another sensor type having a PNP configuration, and/or the sensor types differ by one sensor type having a normally open configuration and another sensor type having a normally closed configuration.

This conveyor can be developed such that the processor unit is adapted to apply the predetermined output signal by programming the sensor connection socket to positive switching logic and PNP, and that the processor unit interprets the input signal into a logic value and compares it with a predetermined reference value on the basis of said logic value, and to specify all the sensor connection sockets from which an input signal corresponding to the logic value "1" as sensor type PNP, normally closed.

This conveyor can be developed such that the processor unit is adapted to monitor the sensor, to receive a first input signal from the sensor in a first configuration step in which the sensor is idle, and to receive a second input signal from the sensor in a second configuration step in which the sensor is busy with an object located in the conveyor segment, and to determine the sensor type by performing a logic analysis on the first and the second input signal.

This conveyor can be developed such that the control unit has a plurality of sensor connection sockets and a plurality of motor connection sockets, and that the processor unit is adapted to calculate a plan for assigning the connected sensors to the connected conveyor drives after step (iv), said method comprising the steps of: placing an object into a conveyor segment and activating the conveyor drive of the conveyor segment in a first conveying direction, monitoring of the sensor signals by the processor unit, and assigning, by the processor unit, of the conveyor drive to a sensor which changes its signal after activation of the conveyor drive.

This conveyor can be developed by the processor unit being adapted to detect and to assign an additional drive of the conveyor segment, by performing the steps in which the processor unit signals the non-assigned additional drive to an operator by outputting a visual or acoustic signal, in particular a predetermined sequence of start-stop operations of the additional drive, the processor unit monitors the sensor signals, the operator manually triggers the sensor, and the processor unit assigns the manually triggered sensor to the additional motor.

This conveyor can be developed such that the processor unit is adapted to switch the sensor activation continually between sensor type PNP and sensor type NPN during monitoring of the sensor signals.

The conveyor according to the invention is adapted, in particular, to carry out the method described above for configuring a control unit, and the control unit according to the invention is likewise adapted to be configured by said method. With regard to the advantages, variants and characteristics of the control unit according to the invention and the conveyor according to the invention, and the developments thereof, reference is made to the corresponding characteristics, advantages and variants of the configuration method described in the foregoing.

A further aspect of the invention is a control unit for a conveyor, wherein the control unit is adapted to control one or more conveyor segments and each conveyor segment comprises a conveyor drive for conveying an object through the conveyor segment, said conveyor drive being in signal communication with the control unit via a motor connection socket, and, if necessary, having a sensor for detecting an object at a position within the conveyor segment, said conveyor being in signal communication with the control unit via a sensor connection socket, wherein the control unit is adapted to self-configure itself and to output a visual signal to a user during said self-configuration in order to signal an incorrect or a correct installation state, wherein the visual signal takes the form of a predetermined sequence of movements by the conveyor drive.

The control unit may be adapted like a control unit having the features described in the foregoing, and the visual signal may preferably form the error message or the visual signal of said control unit.

BRIEF DESCRIPTION OF THE DRAWINGS

Preferred embodiments of the invention shall now be described with reference to the attached Figures, in which

FIG. 4 is an overview of the possible sensor types and their switching logic.

DETAILED DESCRIPTION OF THE EMBODIMENTS

In the Figures, the same or corresponding elements or units are each provided with the same and/or the corresponding reference signs. When an element or a unit has already been described with reference to a particular Figure, a detailed description is dispensed with when discussing another Figure. However, it is to be understood that the present disclosure may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise. The drawings referenced herein are schematic and associated views thereof are not necessarily drawn to scale.

Figure 1:
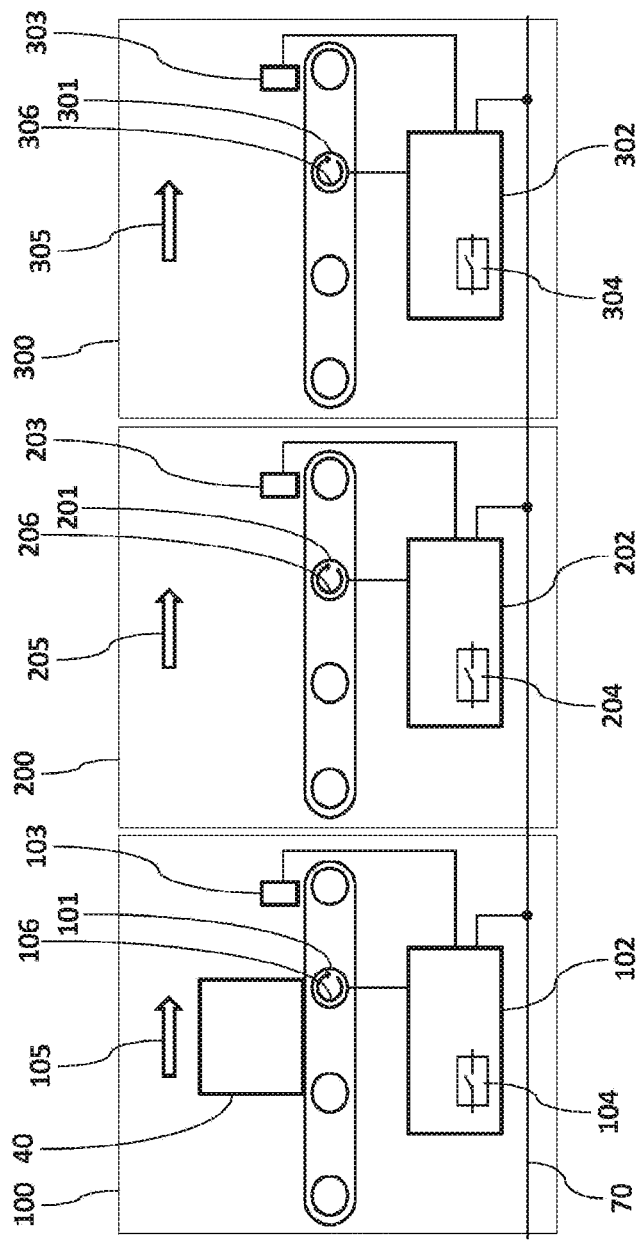
FIG. 1 is a schematic view of a conveyor line comprising three conveyor segments according to a first preferred embodiment of the invention.

FIG. 1 shows a detail of a conveyor consisting of a total of three conveyor segments 100, 200, 300. Conveyor segments 100, 200 and conveyor segments 200, 300 are immediately adjacent to each other and form a conveyor line.

Each conveyor segment 100, 200, 300 contains a conveyor drive 101, 201, 302 which drives the idle rollers of the conveyor segment via belts, thus conveying article 40. The conveying direction 105, 205, 305 is determined by the direction of rotation 106, 206, 306 of conveyor drives 101, 201, 301. The direction of rotation is configured in such a way that the article is conveyed downstream. Each conveyor drive 101, 201, 301 is connected for signalling purposes to a respective control unit 102, 202, 302 by a signal and voltage supply line with a motor connection plug attached thereto, which is inserted into a motor connection socket on the respective control unit.

Each conveyor segment also has a control unit 102, 202, 302, each of which has a Hall sensor 104, 204, 304 for activating the learning mode.

Each conveyor segment 100, 200, 300 has a sensor 103, 203, 404 mounted downstream from the middle of the conveyor segment. These sensors are arranged so that it is possible to detect the presence of an article in the exit area of the individual conveyor segments. Each sensor 103, 203, 303 is connected for signalling purposes to a respective control unit 102, 202, 302 by a signal and voltage supply line with a sensor connection plug attached thereto, which is inserted into a sensor connection socket of the respective control unit.

Data can be exchanged between the control units via bus communication 70.

FIG. 1 shows in a schematic view the initial state of a self-configuration process. A user has placed an article on the first conveyor segment 100 and can activate a configuration mode by moving a magnet (not shown in FIG. 1) close to a Hall sensor 104 arranged on control unit 102. As a consequence of this activation, a processor unit disposed in the control unit is put into a configuration mode and performs a series of self-analysis and self-configuration steps which shall be described in more detail below.

Figure 2:
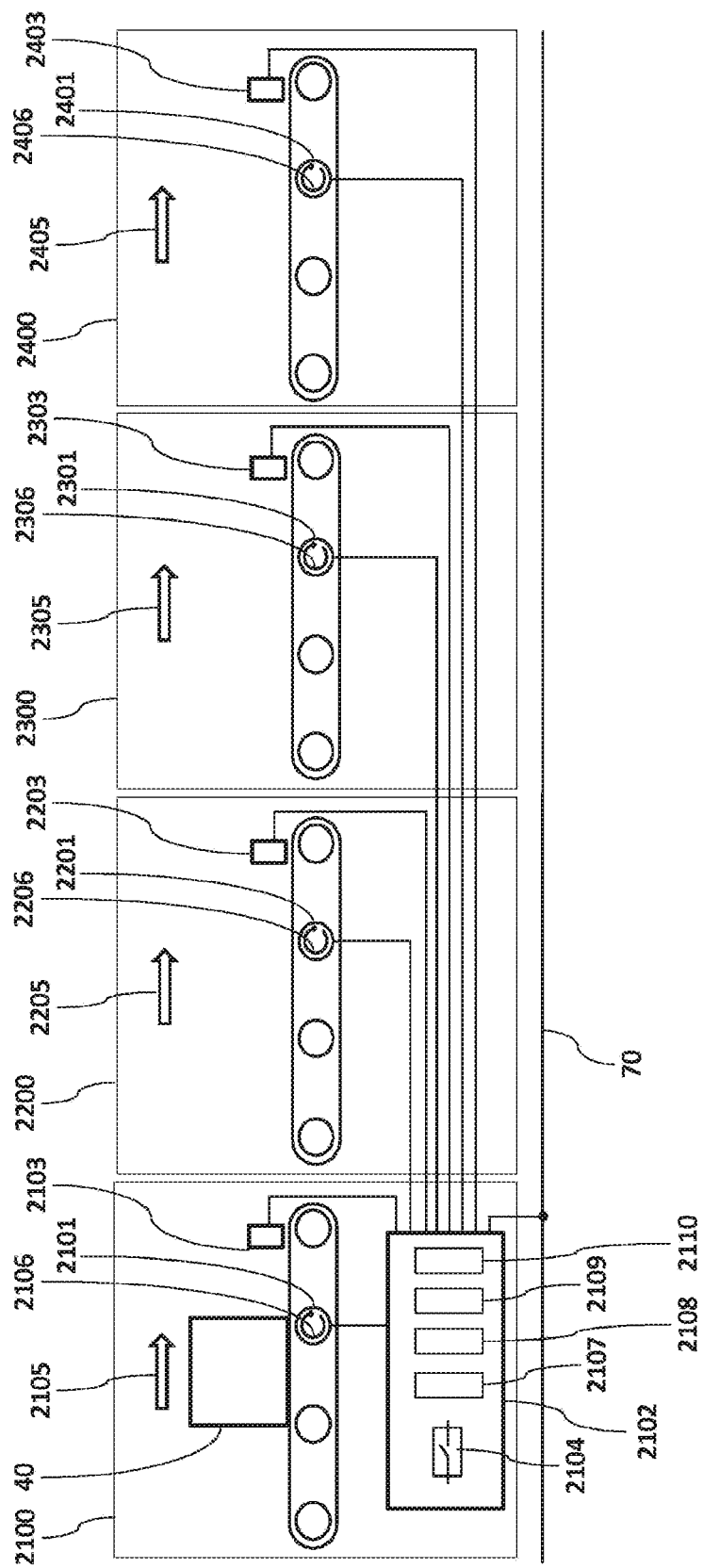
FIG. 2 is a schematic view of a conveyor line comprising a control unit with connector sockets for four conveyor segments according to a second preferred embodiment of the invention.

FIG. 2 shows a second embodiment of a conveyor according to the invention, in which a control unit 2102 controls a plurality of conveyor segments 2100, 2200, 2300, 2400, said control being carried out by four program units 2107, 2108, 2109, 2110 implemented in the control unit. Program units 2107, 2108, 2109, 2110 analyse the signals from four sensors 2103, 2203, 2303, 2403. Program units 2107, 2108, 2109, 2110 control four conveyor drives 2101, 2201, 2301, 2401 in the individual conveyor segments, by activating or deactivating these conveyor drives according to the signals from sensors 2103, 2203, 2303, 2403. The program units in the control unit control the direction of rotation 2106, 2206, 2306, 2406 of the conveyor drives in order to convey an article 40 downstream. By reversing the direction of rotation 2106, 2206, 2306, 2406, the program units can control conveying directions 2105, 2205, 2305, 2405 in conveyor segments 2100, 2200, 2300, 2400. The program units can exchange data within the control unit, in order to detect the direction of rotation of the conveyor drives, for example. Control unit 2102 is also integrated into bus communication 70 and allows data to be exchanged with other control units, for example.

Figure 3:
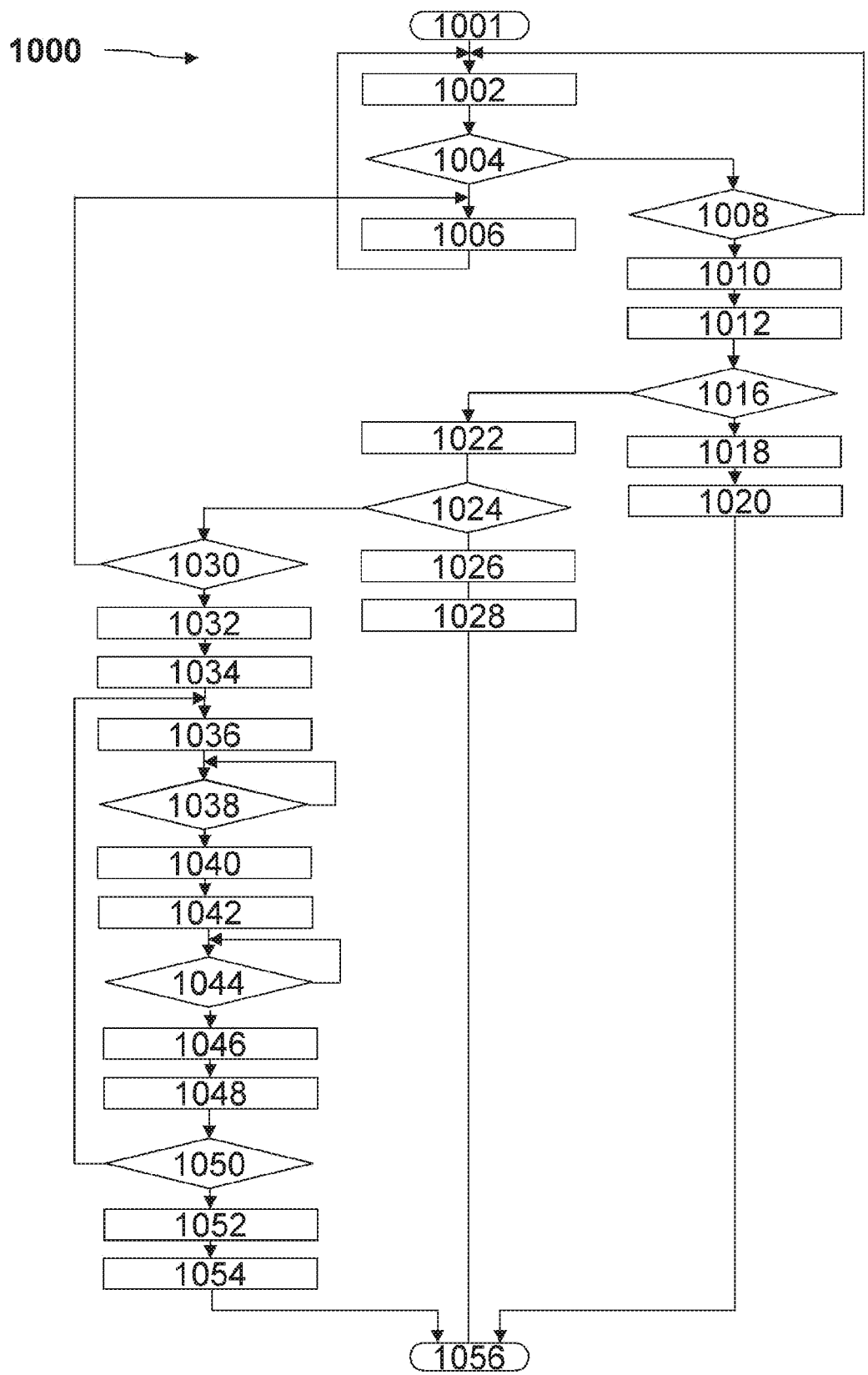
FIG. 3 is an example of a flow diagram for hardware detection by the control unit.

FIG. 3 shows an example of a flow diagram for the inventive method, in the form of flow diagram 300.

After the configuration mode is activated in step 1001, the number of motors connected to a control unit is analysed in step 1002 by the processor unit of the control unit. This is done either by analysing the motor interference signals or by measuring the motor operating currents. In this step, an assignment plan for the motor connection sockets is calculated.

In test step 1004 which then follows, the previously calculated assignment plan for the motor connection sockets is compared with a reference assignment plan. More specifically, checks are performed to determine whether the motors are connected in continuous order to the motor connection sockets. If the reference assignment plan and the assignment plan of the motor connection sockets are not identical, step 1006 is carried out, in which the divergence between the assignment plan of the motor connection sockets and the reference assignment plan is signalled to the user in the form of an error message. This error message is signalled by a sequence comprising a brief forward rotary movement followed by a brief backward rotary movement and a brief forward rotary movement of the conveyor drive which is incorrectly connected. In this way, the user is prompted to adjust the connections used by the motors so that they are consistent with a reference assignment plan. Step 1002 is repeated after step 1006 to that end.

If the reference assignment plan and the assignment plan of the motor connection sockets are identical in step 1004, this is signalled by a sequence consisting of two brief forward rotary movements, after which step 1008 is carried out. In step 1008, a check is performed to determine whether the assignment of the motor connection sockets remains unchanged for a predetermined period, for example for 30 seconds. If the assignment of the motor connection sockets does not remain unchanged for 30 seconds, step 1002 is carried out again. If, in contrast, the assignment of the motor connection sockets remains unchanged for 30 second in test step 1008, step 1010 is then carried out.

In step 1010, unused motor connection sockets are deactivated.

In step 1012 that then follows, the sensor connection sockets are configured by the processor unit of the control unit to sensor type PNP and normally closed. In test step 1016 that then follows, a comparison is made to determine whether the assignment plan of the motor connection sockets is identical to the assignment plan of the sensor connection sockets. If the assignment plan of the motor connection sockets and the sensor connection sockets are identical, step 1018 is carried out. In step 1018, processor unit of the control unit configures the sensor inputs to negative switching logic. In step 1020 that then follows, the processor unit stores the sensor type PNP and the normally closed switching logic. The number of conveyor segments to be controlled, which is determined by the number of detected motors and the number of detected sensors, is stored. If the assignment of the motor connection sockets is not identical in test step 1016 to the assignment of the sensor connection sockets, step 1022 is carried out. In step 1022, the sensor inputs are switched to sensor type NPN and normally closed. In test step 1024 that then follows, the processor unit of the control unit checks whether the assignment of the motor connection sockets is identical to the assignment of the sensor connection sockets. If the assignment of the motor connection sockets is found in test step 1024 to be identical to the assignment of the sensor connection sockets, step 1026 is carried out. If the sensor connections are configured in negative switching logic, the processor unit stores sensor type NPN and normally closed switching logic in the subsequent step 1028.

The number of conveyor segments to be controlled, which is determined by the number of detected motors and the number of detected sensors, is stored. If the assignment of the motor connection sockets is found in test step 1024 to be not identical to the assignment of the sensor connection sockets, test step 1030 is carried out. In test step 1030, a check is performed to determine whether the number of assigned sensor connection sockets is greater than the number of assigned motor connection sockets. If the number of assigned sensor connection sockets is greater than the number of assigned motor connection sockets, step 1006 is carried out once again. If the number of assigned sensor connection sockets is not greater than the number of assigned motor connection sockets, then either there are more motors than sensor units in a conveyor segment, or the sensor units are of the normally open sensor type. Step 1032 is carried to allow unassigned motors to be assigned to sensors, or to determine the configuration of the sensor units. In step 1032, the sensor inputs are switched to positive switching logic.

In step 1034 that then follows, the sensor inputs are still configured in such a way that they continually alternate the sensor type between PNP and NPN.

In step 1036 that then follows, one of the motors which has not yet been assigned is activated in a predetermined motion pattern, for example it is activated for one second, then deactivated for three seconds, and then activated for one second. Which of the as yet unassigned motors is to be assigned at this moment is signalled in this way to the user. In step 1038 that then follows, a check is performed to determine whether a change of signal is triggered at any one of the sensor inputs. If no change of signal is triggered at any one of the sensor inputs in test step 1038, test step 1038 is repeated. If a change of signal is triggered at any one of the sensor inputs in test step 1038, step 1040 is then carried out. The triggered sensor is assigned to the activated motor in step 1040. This step is followed by step 1042, in which the assigned motor is put into continuous operation in order to acknowledge the assignment.

In test step 1044 which then follows, a check is performed to determine whether a new change of signal is triggered at the respective sensor input. If a new change of signal is triggered at the respective sensor input, test step 1044 is carried out again. If a new change of signal is carried out at the respective sensor input in test step 1044, step 1046 is carried out. In step 1046, the previously activated motor is deactivated. In step 1048 that then follows, the number of motors which have not yet been assigned is determined.

In test step 1050, a check is performed to determine whether the number of motors not yet assigned is greater than zero. If the number of motors not yet assigned is greater than zero, step 1036 is carried out once again. If the number of motors not yet assigned is not greater than zero, step 1052 is carried out. In step 1052, the sensor inputs are switched to positive switching logic. In step 1054 that then follows, the assignment of the motors to the sensors is stored, and the sensor type is stored as the detected sensor type (PNP or NPN) and the normally open switching characteristic. The method is terminated in step 1056 that then follows.

FIG. 4 shows an overview of the possible switching states of a sensor that may occur. The output stage of a sensor can be built using bipolar transistors, for example, which are available as NPN-type and as PNP-type bipolar transistors. Sensors also differ in their switching behaviour. A distinction is made in this regard between closing contacts, which are normally open, and break contacts, which are normally closed. Their switching behaviour depends on the configuration of a sensor. Sensors can be distinguished, for example, as photoelectric sensors and as photoelectric barriers. According to the various embodiments and configurations of the sensors, the switching and logic states shown in the overview can result at the output of a sensor.

It will be understood that any described processes or steps within described processes may be combined with other disclosed processes or steps to form structures within the scope of the present disclosure. The exemplary structures and processes disclosed herein are for illustrative purposes and are not to be construed as limiting.

It will be understood by one having ordinary skill in the art that construction of the present disclosure and other components is not limited to any specific material. Other exemplary embodiments of the disclosure disclosed herein may be formed from a wide variety of materials, unless described otherwise herein.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It is also to be understood that variations and modifications can be made on the aforementioned structures and methods without departing from the concepts of the present invention, and further it is to be understood that such concepts are intended to be covered by the following claims unless these claims by their language expressly state otherwise.

The invention claimed is:

1. A method for configuring a control unit in a conveyor, wherein a control unit controls one or more conveyor segments and each conveyor segment comprises:
   a. a conveyor drive for conveying an object through the conveyor segment, said conveyor drive being in signal communication with the control unit via a motor connection socket, and
   b. a sensor for detecting an object at a position within the conveyor segment, said conveyor being in signal communication with the control unit via a sensor connection socket,
   wherein the control unit self-configures itself, said self-configuration comprising the steps of:
   (i) activating a configuration mode in the control unit,
   (ii) receiving a signal from each motor connection socket or sensor connection socket of the control unit in a processor unit of the control unit,
   (iii) comparing the received signal(s) with a comparative value stored in the control unit, and
   (iv) determining whether a conveyor drive or a sensor is connected to a motor connection socket or a sensor connection socket of the control unit, respectively, based on the comparison of the signal(s) with the comparative value; and
   wherein:
   each motor connection socket is polled in step (ii) by the processor unit for the signal, the signal comprising an interference signal;
   a comparison is made in step (iii) to determine whether the interference signal has been received or whether the interference signal has not been received, and it is determined in step (iv) for each motor connection socket that a conveyor drive is connected to the motor connection socket if the interference signal has not been received, and that the conveyor drive is not connected to the motor connection socket if the interference signal is received; or
   all the conveyor drives connected to the control unit are activated in step (i), an activity signal, comprising a motor operating current or a signal from a gyro sensor mechanically coupled to the conveyor drive, is received at each motor connection socket in the processor unit as the signal in step (ii), the received activity signal is compared in step (iii) with a reference value as the comparative value, and, in step (iv), if the activity signal is present, it is determined that a conveyor drive is connected to the motor connection socket, and if there is no activity signal it is determined that the conveyor drive is not connected to the motor connection socket.

2. A method for configuring a control unit in a conveyor, wherein a control unit controls one or more conveyor segments and each conveyor segment comprises:
   a. a conveyor drive for conveying an object through the conveyor segment, said conveyor drive being in signal communication with the control unit via a motor connection socket, and
   b. a sensor for detecting an object at a position within the conveyor segment, said conveyor being in signal communication with the control unit via a sensor connection socket,
   wherein the control unit self-configures itself, said self-configuration comprising the steps of:

(i) activating a configuration mode in the control unit,
(ii) receiving a signal from each motor connection socket or sensor connection socket of the control unit in a processor unit of the control unit,
(iii) comparing the received signal(s) with a comparative value stored in the control unit, and
(iv) determining whether a conveyor drive or a sensor is connected to a motor connection socket or a sensor connection socket of the control unit, respectively, based on the comparison of the signal(s) with the comparative value; and
wherein the control unit has a plurality of motor connection sockets and that an assignment plan for the motor connection sockets is calculated after step (iv) and compared with a reference assignment plan comprising a reference assignment pattern for every possible number of connected conveyor drives, and that in the event of any divergence from the reference assignment plan, a visual or acoustic signal error message is outputted by the control unit.

3. A method for configuring a control unit in a conveyor, wherein a control unit controls one or more conveyor segments and each conveyor segment comprises:
a. a conveyor drive for conveying an object through the conveyor segment, said conveyor drive being in signal communication with the control unit via a motor connection socket, and
b. a sensor for detecting an object at a position within the conveyor segment, said conveyor being in signal communication with the control unit via a sensor connection socket,
wherein the control unit self-configures itself, said self-configuration comprising the steps of:
(i) activating a configuration mode in the control unit,
(ii) receiving a signal from each motor connection socket or sensor connection socket of the control unit in a processor unit of the control unit,
(iii) comparing the received signal(s) with a comparative value stored in the control unit, and
(iv) determining whether a conveyor drive or a sensor is connected to a motor connection socket or a sensor connection socket of the control unit, respectively, based on the comparison of the signal(s) with the comparative value; and
wherein:
each sensor connection socket is polled in step (ii) by the processor unit for an interference signal as the signal, a comparison is made in step (iii) to determine whether the interference signal has been received or whether the interference signal has not been received, and it is determined in step (iv) for each sensor connection socket that a sensor is connected to the sensor connection socket if the interference signal has not been received, and that no sensor is connected to the sensor connection socket if the interference signal is received; or
in step (i), all the sensors connected to the control unit are activated, in step (ii), a sensor signal is received at each sensor connection socket in the processor unit, in step (iii), the received sensor signal is compared with a reference value as the comparative value, and in step (iv), if the sensor signal is present, it is determined that a sensor is connected to the sensor connection socket and, in the absence of the sensor signal, it is determined that no sensor is connected to the sensor connection socket.

4. A method for configuring a control unit in a conveyor, wherein a control unit controls one or more conveyor segments and each conveyor segment comprises:
a. a conveyor drive for conveying an object through the conveyor segment, said conveyor drive being in signal communication with the control unit via a motor connection socket, and
b. a sensor for detecting an object at a position within the conveyor segment, said conveyor being in signal communication with the control unit via a sensor connection socket,
wherein the control unit self-configures itself, said self-configuration comprising the steps of:
(i) activating a configuration mode in the control unit,
(ii) receiving a signal from each motor connection socket or sensor connection socket of the control unit in a processor unit of the control unit,
(iii) comparing the received signal(s) with a comparative value stored in the control unit, and
(iv) determining whether a conveyor drive or a sensor is connected to a motor connection socket or a sensor connection socket of the control unit, respectively, based on the comparison of the signal(s) with the comparative value; and
wherein the control unit has a plurality of sensor connection sockets and that an assignment plan for the sensor connection sockets is calculated after step (iv) and compared with a reference assignment plan comprising a reference assignment pattern for every possible number of connected sensors, and that in the event of any divergence from the reference assignment plan, an error message, comprising a visual or acoustic signal, is outputted by the control unit.

5. A method for configuring a control unit in a conveyor, wherein a control unit controls one or more conveyor segments and each conveyor segment comprises:
a. a conveyor drive for conveying an object through the conveyor segment, said conveyor drive being in signal communication with the control unit via a motor connection socket, and
b. a sensor for detecting an object at a position within the conveyor segment, said conveyor being in signal communication with the control unit via a sensor connection socket,
wherein the control unit self-configures itself, said self-configuration comprising the steps of:
(i) activating a configuration mode in the control unit,
(ii) receiving a signal from each motor connection socket or sensor connection socket of the control unit in a processor unit of the control unit,
(iii) comparing the received signal(s) with a comparative value stored in the control unit, and
(iv) determining whether a conveyor drive or a sensor is connected to a motor connection socket or a sensor connection socket of the control unit, respectively, based on the comparison of the signal(s) with the comparative value; and
wherein the processor unit compares the number of detected sensors with the number of detected conveyor drives and generates an error message if the number of detected sensors is greater than the number of detected conveyor drives.

6. A method for configuring a control unit in a conveyor, wherein a control unit controls one or more conveyor segments and each conveyor segment comprises:

a. a conveyor drive for conveying an object through the conveyor segment, said conveyor drive being in signal communication with the control unit via a motor connection socket, and
b. a sensor for detecting an object at a position within the conveyor segment, said conveyor being in signal communication with the control unit via a sensor connection socket, wherein the control unit self-configures itself, said self-configuration comprising the steps of:
(i) activating a configuration mode in the control unit,
(ii) receiving a signal from each motor connection socket or sensor connection socket of the control unit in a processor unit of the control unit,
(iii) comparing the received signal(s) with a comparative value stored in the control unit, and
(iv) determining whether a conveyor drive or a sensor is connected to a motor connection socket or a sensor connection socket of the control unit, respectively, based on the comparison of the signal(s) with the comparative value; and wherein the control unit is adapted to connect and to process sensor signals from different types of sensors and that the sensor type is determined by:
the processor unit applying a predetermined output signal to each sensor connection socket;
the processor unit receiving an input signal from each sensor connection socket;
the received input signal being compared with a predetermined reference value; and
the sensor type being determined on the basis of a comparison of the received sensor signal with the predetermined reference value.

7. The method according to claim 6, wherein the sensor types differ in that one sensor type has an NPN configuration and another sensor type has a PNP configuration or in that the sensor types differ by one sensor type having a normally open configuration and another sensor type having a normally closed configuration.

8. The method pursuant to claim 6, wherein the predetermined output signal is applied by programming the sensor connection socket to positive switching logic and PNP, and that the input signal is interpreted into a logic value by the processor unit and that a comparison with a predetermined reference value is made on the basis of said logic value, and that all the sensor connection sockets from which an input signal corresponding to the logic value "1" are specified as sensor type PNP, normally closed.

9. The method pursuant to claim 6, wherein:
the sensor is monitored by the processor unit;
the sensor is idle in a first configuration step, and a first input signal from the sensor is received by the processor unit;
the sensor is busy in a second configuration step with an object located in the conveyor segment, and a second input signal from the sensor is received by the processor unit; and
the sensor type is determined by the processor unit by performing a logic analysis on the first and the second input signal.

10. A method for configuring a control unit in a conveyor, wherein a control unit controls one or more conveyor segments and each conveyor segment comprises:
a. a conveyor drive for conveying an object through the conveyor segment, said conveyor drive being in signal communication with the control unit via a motor connection socket, and
b. a sensor for detecting an object at a position within the conveyor segment, said conveyor being in signal communication with the control unit via a sensor connection socket, wherein the control unit self-configures itself, said self-configuration comprising the steps of:
(i) activating a configuration mode in the control unit,
(ii) receiving a signal from each motor connection socket or sensor connection socket of the control unit in a processor unit of the control unit,
(iii) comparing the received signal(s) with a comparative value stored in the control unit, and
(iv) determining whether a conveyor drive or a sensor is connected to a motor connection socket or a sensor connection socket of the control unit, respectively, based on the comparison of the signal(s) with the comparative value; and wherein the control unit has a plurality of sensor connection sockets and a plurality of motor connection sockets, and after step (iv) a plan for assigning the connected sensors to the connected conveyor drives is calculated, said method further comprising the steps of:
placing an object into a conveyor segment and activating the conveyor drive of the conveyor segment in a first conveying direction;
monitoring the sensors for a signal by the processor unit; and
assigning, by the processor unit, of the conveyor drive to a sensor which changes its signal after activation of the conveyor drive.

11. A method for configuring a control unit in a conveyor, wherein a control unit controls one or more conveyor segments and each conveyor segment comprises:
a. a conveyor drive for conveying an object through the conveyor segment, said conveyor drive being in signal communication with the control unit via a motor connection socket, and
b. a sensor for detecting an object at a position within the conveyor segment, said conveyor being in signal communication with the control unit via a sensor connection socket, wherein the control unit self-configures itself, said self-configuration comprising the steps of:
(i) activating a configuration mode in the control unit,
(ii) receiving a signal from each motor connection socket or sensor connection socket of the control unit in a processor unit of the control unit,
(iii) comparing the received signal(s) with a comparative value stored in the control unit, and
(iv) determining whether a conveyor drive or a sensor is connected to a motor connection socket or a sensor connection socket of the control unit, respectively, based on the comparison of the signal(s) with the comparative value; and wherein a non-assigned additional conveyor drive of the conveyor segment is detected and assigned by performing the steps in which:
the processor unit signals the non-assigned additional drive to an operator by outputting a visual or acoustic signal comprising a predetermined sequence of start-stop operations of the additional conveyor drive;
the processor unit monitors the sensor for a signal;
the operator manually triggers the sensor; and
the processor unit assigns the manually triggered sensor to the non-assigned additional conveyor drive.

12. The method pursuant to claim 11, wherein during monitoring of the sensor, the sensor activation is continually switched between sensor type PNP and sensor type NPN.

13. A method for configuring a control unit in a conveyor, wherein the control unit controls one or more conveyor segments and each conveyor segment comprises:
  a. a conveyor drive for conveying an object through the conveyor segment, said conveyor drive being in signal communication with the control unit via a motor connection socket; and
  b. a sensor for detecting an object at a position within the conveyor segment, said conveyor being in signal communication with the control unit via a sensor connection socket;
  wherein the control unit self-configures itself, and a visual signal is outputted to a user during said self-configuration to signal an incorrect or a correct installation state, wherein the visual signal takes the form of a predetermined sequence of movements by the conveyor drive; and
  wherein the self-configuration is carried out in accordance with the steps of:
  (i) activating a configuration mode in the control unit,
  (ii) receiving a signal from each motor connection socket or sensor connection socket of the control unit in a processor unit of the control unit,
  (iii) comparing the received signal(s) with a comparative value stored in the control unit, and
  (iv) determining whether a conveyor drive or a sensor is connected to a motor connection socket or a sensor connection socket of the control unit, respectively, based on the comparison of the signal(s) with the comparative value; and
  the signal forms a signal message according to a predetermined sequence of start-stop operations of the conveyor device.

14. A control unit for a conveyor, wherein the control unit is adapted to control one or more conveyor segments and each conveyor segment comprises:
  a. a conveyor drive for conveying an object through the conveyor segment, said conveyor drive being in signal communication with the control unit via a motor connection socket; and
  b. a sensor for detecting an object at a position within the conveyor segment, said conveyor being in signal communication with the control unit via a sensor connection socket;
  wherein the control unit includes an electronic processor unit which is adapted to self-configure itself, said self-configuration comprising the steps of:
  (i) activating a configuration mode in the control unit;
  (ii) receiving a signal from each motor connection socket or sensor connection socket of the control unit in a processor unit of the control unit;
  (iii) comparing the received signal(s) with a comparative value stored in the control unit; and
  (iv) determining whether a conveyor drive or a sensor is connected to a motor connection socket or a sensor connection socket of the control unit, respectively, based on the comparison of the signal(s) with the comparative value.

15. A control unit for a conveyor, wherein the control unit is adapted to control one or more conveyor segments and each conveyor segment comprises:
  a. a conveyor drive for conveying an object through the conveyor segment, said conveyor drive being in signal communication with the control unit via a motor connection socket; and
  b. a sensor for detecting an object at a position within the conveyor segment, said conveyor being in signal communication with the control unit via a sensor connection socket;
  wherein the control unit is designed to self-configure itself, and that a visual signal is outputted to a user during said self-configuration to signal an incorrect or a correct installation state, and wherein the visual signal comprises a predetermined sequence of movements by the conveyor drive.

* * * * *